(12) United States Patent
Chou et al.

(10) Patent No.: US 9,519,613 B2
(45) Date of Patent: Dec. 13, 2016

(54) METHOD FOR INTEGRATING APPLICATIONS IN AN ELECTRONIC ADDRESS BOOK

(75) Inventors: Howard Chou, Redwood City, CA (US); Nancy Benovich Gilby, Foster City, CA (US); Sharad Uni, Fremont, CA (US); Nisha Ravi, Milpitas, CA (US); Brandon Salzberg, San Francisco, CA (US); Jonathan Salcedo, San Francisco, CA (US)

(73) Assignee: Asurion, LLC, Nashville, TN (US)

( * ) Notice: Subject to any disclaimer, the term of this patent is extended or adjusted under 35 U.S.C. 154(b) by 246 days.

(21) Appl. No.: 12/698,874

(22) Filed: Feb. 2, 2010

(65) Prior Publication Data

US 2011/0035673 A1  Feb. 10, 2011

Related U.S. Application Data

(60) Provisional application No. 61/149,120, filed on Feb. 2, 2009.

(51) Int. Cl.
| | |
|---|---|
| *G06F 15/16* | (2006.01) |
| *G06F 17/30* | (2006.01) |
| *G06Q 10/10* | (2012.01) |
| *G06F 11/20* | (2006.01) |
| *G06Q 50/00* | (2012.01) |

(52) U.S. Cl.
CPC ............ *G06F 15/16* (2013.01); *G06F 11/2082* (2013.01); *G06F 17/30575* (2013.01); *G06Q 10/10* (2013.01); *G06Q 50/01* (2013.01)

(58) Field of Classification Search
CPC ..... G06F 15/16; G06Q 50/01; G06Q 10/1053; G06Q 99/00

USPC ........................................ 715/739; 709/206
See application file for complete search history.

(56) References Cited

U.S. PATENT DOCUMENTS

| | | | | |
|---|---|---|---|---|
| 8,572,191 | B2* | 10/2013 | Bonforte | 709/206 |
| 2004/0215793 | A1* | 10/2004 | Ryan et al. | 709/229 |
| 2005/0120084 | A1* | 6/2005 | Hu | G06Q 10/107 |
| | | | | 709/206 |
| 2005/0182745 | A1* | 8/2005 | Dhillon et al. | 707/1 |
| 2005/0198299 | A1* | 9/2005 | Beck et al. | 709/226 |
| 2005/0216300 | A1* | 9/2005 | Appelman et al. | 705/1 |
| 2006/0042483 | A1* | 3/2006 | Work et al. | 101/91 |
| 2006/0224675 | A1* | 10/2006 | Fox et al. | 709/206 |
| 2007/0266097 | A1* | 11/2007 | Harik et al. | 709/204 |
| 2008/0134052 | A1* | 6/2008 | Davis | G06Q 10/10 |
| | | | | 715/744 |
| 2008/0152097 | A1* | 6/2008 | Kent | H04L 12/66 |
| | | | | 379/93.01 |

(Continued)

OTHER PUBLICATIONS

Authorized officer Lee W. Young, International Search Report and Written Opinion in PCT/US2010/22955, mailed Mar. 29, 2010, 7 pages.

(Continued)

*Primary Examiner* — Amy M Levy
(74) *Attorney, Agent, or Firm* — Fish & Richardson P.C.

(57) ABSTRACT

A method for integrating interactions in an address book application that includes managing a plurality of contacts of an electronic address book, identifying a contact with a relationship to an interaction service, collecting dynamic information corresponding to the identified contact, and facilitating an interaction using the dynamic information.

20 Claims, 5 Drawing Sheets

(56) References Cited

U.S. PATENT DOCUMENTS

| | | | |
|---|---|---|---|
| 2008/0205655 A1* | 8/2008 | Wilkins et al. | 380/279 |
| 2008/0244020 A1* | 10/2008 | Dolan | 709/206 |
| 2009/0031232 A1* | 1/2009 | Brezina et al. | 715/764 |
| 2009/0063178 A1* | 3/2009 | Pousti et al. | 705/1 |
| 2009/0143052 A1* | 6/2009 | Bates et al. | 455/414.2 |
| 2009/0182821 A1* | 7/2009 | Allen et al. | 709/206 |
| 2009/0221280 A1* | 9/2009 | Mitelberg | 455/418 |
| 2009/0234876 A1* | 9/2009 | Schigel et al. | 707/102 |
| 2009/0254840 A1* | 10/2009 | Churchill et al. | 715/753 |
| 2009/0300139 A1* | 12/2009 | Shoemaker | G06Q 10/10 709/217 |
| 2009/0327432 A1* | 12/2009 | Augustine | G06Q 10/10 709/206 |
| 2010/0144323 A1* | 6/2010 | Collins | G06Q 10/10 455/414.1 |
| 2010/0169841 A1* | 7/2010 | Singh | 715/863 |
| 2010/0184416 A1* | 7/2010 | Gupta et al. | 455/414.3 |
| 2010/0211563 A1* | 8/2010 | Macchietti et al. | 707/722 |
| 2010/0274815 A1* | 10/2010 | Vanasco | 707/798 |
| 2010/0318925 A1* | 12/2010 | Sethi et al. | 715/760 |
| 2010/0333019 A1* | 12/2010 | Oschwald | G06Q 30/02 715/810 |
| 2011/0061016 A1* | 3/2011 | Song et al. | 715/779 |
| 2011/0321132 A1* | 12/2011 | Slingerland et al. | 726/4 |
| 2012/0150955 A1* | 6/2012 | Tseng | H04L 51/22 709/204 |

OTHER PUBLICATIONS

Authorized officer Masashi Honda, International Preliminary Report on Patentability in PCT/US2010/022955, issued Aug. 2, 2011, 5 pages.

* cited by examiner

METHOD FOR INTEGRATING APPLICATIONS IN AN ELECTRONIC ADDRESS BOOK

CROSS-REFERENCE TO RELATED APPLICATIONS

This application claims the benefit of U.S. Provisional Application No. 61/149,120, filed 2 Feb. 2009, entitled "Electronic Address Book with Integrated Context-Based Mobile Applications" which is incorporated in its entirety by this reference.

TECHNICAL FIELD

This invention relates generally to the mobile device field, and more specifically to a new and useful method for integrating dynamic interactions in an electronic address book in the mobile device field.

BACKGROUND

The use of online social networks and web-based applications has become increasingly more common in recent years. At the same time, the use of smart phones and mobile devices has also become increasingly popular. The increase in the number of mobile smart phones means more and more users are performing computer tasks while on the go. However, interface limitations, multi-tasking capability, and even battery life issues all prevent ready access and use of available services made possible through the numerous social networks and web-based applications. In particular, users find it difficult to not only open yet another application to accomplish a simple task, such as a response to a communication, but also to find an appropriate application in an application market filled with hundreds of thousands of applications. Likewise, users want a choice in communication channels and additional services tied into the workflow beyond what is currently provided in the native mobile address book, and beyond what the software providers themselves can possibly cover. Thus, there is a need in the mobile device field to create a new and useful method for integrating applications in an electronic address book. This invention provides such a new and useful method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
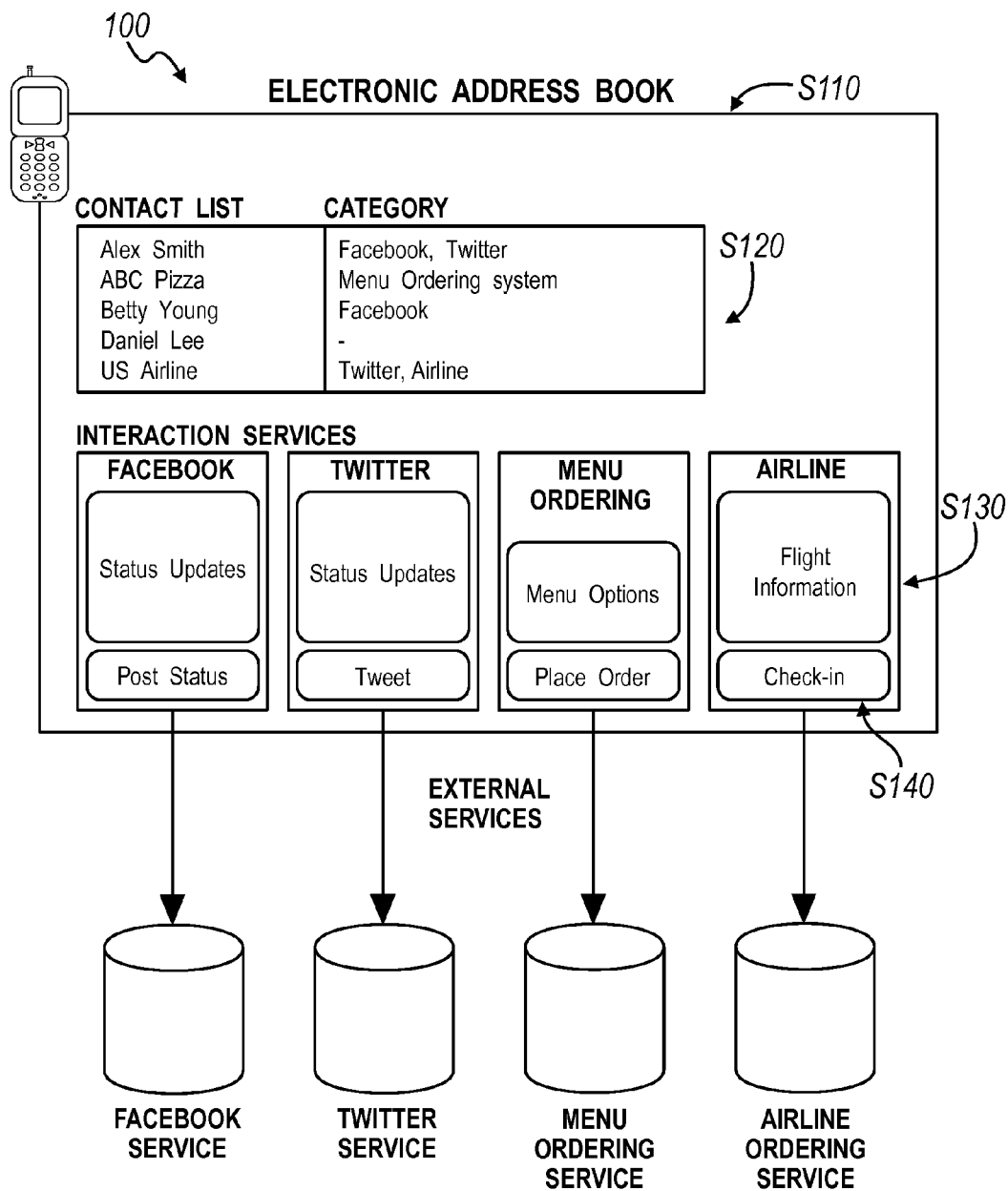
FIG. 1 is a schematic representation of a first preferred embodiment of the invention.

As shown in FIG. 1, a method 100 for integrating applications in an electronic address book of a preferred embodiment includes managing a plurality of contacts of an electronic address book S110; identifying a contact with a relationship to an interaction service S120, collecting dynamic information corresponding to the identified contact S130, and facilitating an interaction within the contact using the dynamic information S140. The method functions to provide improved and centralized interaction possibilities for a user and a contact based on contextual information. The method is preferably used with a mobile computing device such as a mobile telephone, but the method may alternatively be used on a desktop computer or any suitable electronic device with a catalog of entities. The method is preferably implemented through an application but may alternatively be facilitated by an API (Application Protocol Interface) or any suitable platform/service that an outside party may utilize. In one embodiment of the method 100, is a plurality of applications that may be integrated with the electronic address book to provide an interaction service. The applications are preferably dedicated to at least one communication service (e.g., a social networking website). This functions to integrate a plurality of social networking sites with the electronic address book. As another embodiment of the method 100, a contact may have additional interaction services enabled that are specific to the type of contact such as a business contact (e.g., a restaurant or movie theater), which provides extra functionality not implemented through a regular contact with only static data. The interaction services may additionally be facilitated through embedded applications that run within the electronic address book. The embedded application is preferably a full client-side, stand-alone application that preferably calls to an outside API of an external service, but the embedded application may alternatively be a widget, a web view, or any suitable add-on application. The embedded applications may be installed or alternatively come pre-installed in the electronic address book application. The embedded applications may be integrated into numerous aspects of the address book and even integration into other embedded applications. The interaction service in one variation may be additional views (or dedicated portions/channels within the address book) within the address book where interactions are specific to the view the user has entered. For example all content related to an embedded application for a social network may be accessible through a specific social network view (or channel). In another variation, the interactive services may be made available based on the contact, or alternatively, group of contacts. For example, by selecting a contact, additional interactive services utilizing dynamic information are preferably available for use. Selecting a contact may launch an embedded application or may alternatively display an embedded application along with the static data of the contact. This is preferably used with a business contact that has special features enabled, but may alternatively be used with a friend contact.

Figure 2:
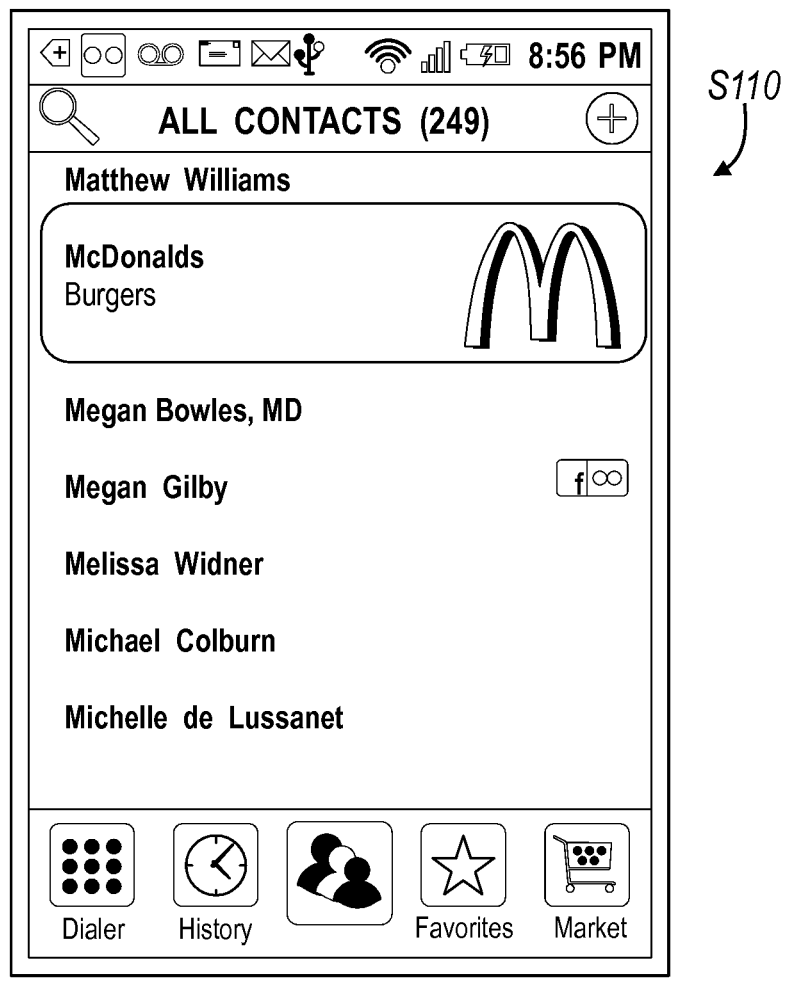
FIG. 2 is a detailed view of managing a contact list of an electronic address book.

Step S110, which includes managing a plurality of contacts of an address book, functions to provide the functionality of organizing and presenting a plurality of entries in an electronic address book as shown in FIG. 2. The contacts preferably have associated static data. The static data is preferably created when the contact is created or edited by a user or an application. A contact may be added, deleted, or edited in the address book. The static data preferably includes a plurality of data fields. The data fields may contain any suitable form of data. A list of exemplary static data fields includes contact name, company name, job title, phone numbers, email addresses, mailing addresses, URLs, notes, photos, and/or any suitable data field. The organization of the contacts is preferably set according to one of the static data fields. For example, the contacts may be organized alphabetically by contact name. A user may alternatively filter the contacts by those identified with an interaction service. For example, a user may filter contacts by those that have a relationship with a particular social network application.

Figure 3:
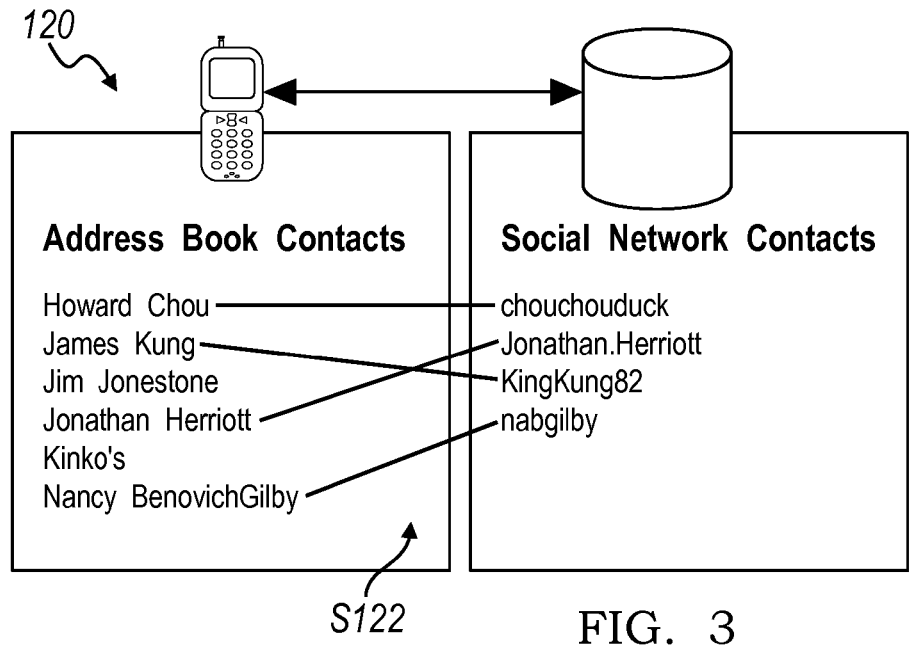
FIG. 3 is a schematic representation of matching a contact from an external service to the plurality of contacts of the address book.
Figure 4:
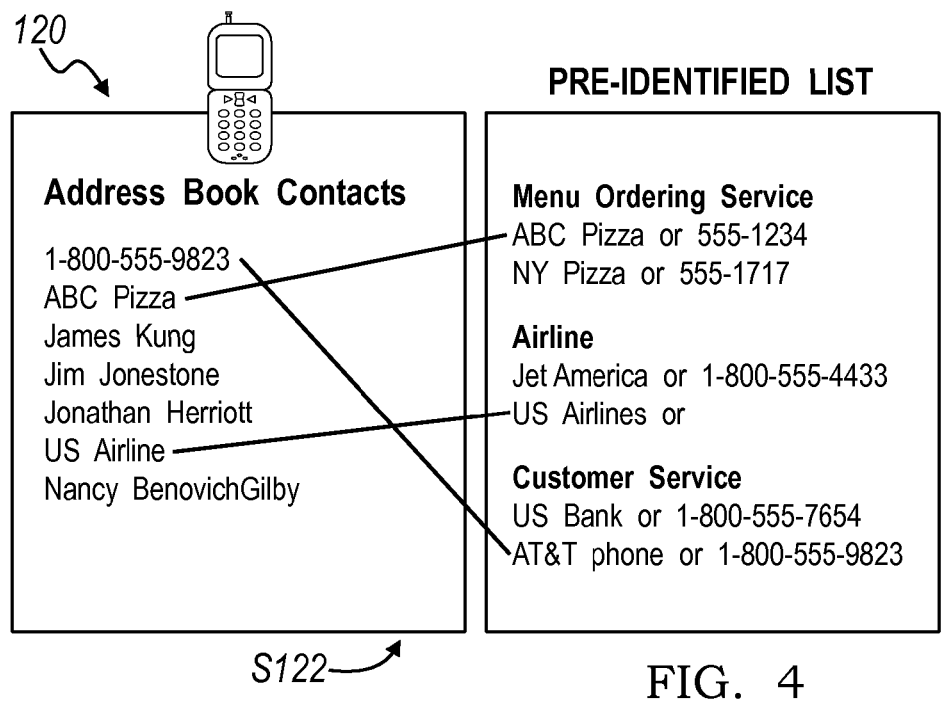
FIG. 4 is a schematic representation of matching static data of a contact to an entity with a predefined identity.

Step S120, which includes identifying a contact with a relationship to an interaction service, functions to match a contact with an appropriate interaction service for providing an additional dynamic form of communication between a user and a contact. The interaction service is preferably an outside party or application such as a social networking website, a ticket purchasing website, an online store, review website, a map or directions service, Voice over Internet Protocol (VoIP) service, gaming service, and/or any suitable network based service. In a first variation shown in FIG. 3, Step S120 includes matching contacts from an external service to the plurality of contacts of the electronic address book S122. In this variation, the external service is preferably a social networking website or any suitable website in which a user may have 'friends' or 'connections'. The contacts matched with the contacts of the external service are preferably individual people or "friends" of the user, but may alternatively be any suitable entity with which a user may have a social network connection, such as a business. Upon matching a contact with an external service, the contact is preferably identified as having the external service. In an additional or alternative variation shown in FIG. 4, Step S120 may include matching the static data of a contact to an entity with an assigned categorization S124. In this variation, the type of contact is preferably identified by matching a contact with an entity in a central database of categorized contacts. The categorized contacts preferably have pre-identified interaction services that may be used with the contact. This preferably functions to identify interaction services that make contextual sense, depending on the type of contact. Step S124 preferably identifies business contacts and more specifically, identifies the type of business such as restaurant, movie theater, doctor's office, airline, customer service, or any suitable category of business. Additional interactions are preferably enabled, specific to the type of contact. A contact can preferably be identified with a plurality of interaction services such that a single contact may have a plurality of external services and be automatically matched to an assigned categorization. An identified contact preferably has additional data fields and related information added to the static data of the contact. The additional data preferably identifies the related interaction service(s) associated with the relationship and may additionally include any other information obtained during the identification process. For example, a screen name used in an external service may be stored as a data field of the contact. Alternatively, an embedded application may be stored within the contact data or any suitable device may be used to enable the dynamic interactions for the contact.

Step S122, which includes matching contacts from an external service to the plurality of contacts of the electronic address book, functions to identify contacts that are associated with the same person, business, or entity. As mentioned above, the external service of this step is preferably a site with a social network system such as Facebook, Twitter, Flickr, YouTube, Amazon, and/or any suitable site where a user has connections to other users. The login credentials of a user are preferably retrieved and submitted to the external service. After approval of the credentials, the electronic address book, or an embedded application of the electronic address book, preferably has access to the user related information on the external service. A 'friend' (i.e., contact) associated with the external service is preferably matched correspondingly with a contact that shares similar static data. The static data of the contact is preferably compared to the available information of the external service such as names, usernames, email addresses, networks (place of work, school, city), phone numbers, or any suitable information. The matching may use alternative forms of matching such as facial recognition or shared contacts. A matching probability may be calculated based on the type of information and number of matching items. A user may additionally approve matched contacts. In some situations, user approval may be required based on the matching probability. As a matching example, a contact with the name John Smith may be matched with a friend on a social network that is registered under the email address J.Smith@example.com. Additionally, as more external services are connected with a contact, the additional information of social networks is added to the information that can be used to match contacts. In the example used above, the first social network may also have information that the username of John Smith is Appleseed 123. A second social network with no shared information with the original contact information may still be matched to John Smith because of the shared username Appleseed 123 with the first social network.

Step S124, which includes matching static data of a contact to an entity with an assigned categorization, functions to automatically identify a classification of a contact. This step is preferably applied to contacts without requiring any specific information about the user. Step S124 is preferably used to classify businesses and the type of business. Some exemplary categories may include business, business with appointments, call center, restaurant with reservation, specific chain of restaurant, theater, airline, hospital, or any suitable category that may have a specialized interaction. This is preferably performed by matching the contact name with an entity name (e.g., a business name). For example, a contact with the name of "ABC Pizza" will preferably be identified as a pizza restaurant, and if ABC Pizza is a known pizza chain, the contact may even be specifically related to interactions specific to the ABC Pizza chain such as location finding or pizza ordering. As another example, the phone number of a contact may be matched to a pre-identified entity. Using the example above, a contact may have the contact name of "Amy's Favorite Place" but with the phone number of ABC Pizza. This contact would also preferably be identified as a pizza restaurant.

Step S130, which includes collecting dynamic information corresponding to the identified contact, functions to retrieve updated or real-time information related to the interaction associated with the contact. Dynamic information may be pulled from a number of various sources. As one source, the dynamic information is preferably retrieved from an external service such as from a media stream of a social network. The dynamic information may additionally or alternatively be information related to the user such as location, calendar, email, to-do list, or any suitable information. Additional services may additionally be used as a source of information such as time, weather, stock market, etc. The dynamic information is preferably shared within shared data within the address book. The dynamic information may be shared within the context of the contact or within the operation of the electronic address book such as with the history view described below. The dynamic information is preferably retrieved from the service in the background, but may alternatively be retrieved upon user selection of a contact or interaction service view. The sources of dynamic information are preferably determined by the interaction service. An application within the address book may additionally be the device retrieving the dynamic information or the dynamic information may be retrieved by any suitable service. When new dynamic information is retrieved, the information may be categorized as an event. An event is preferably added to an event history. The aggregated history of events is preferably presented in total or by contact. The history can additionally be filtered by the type of event, dynamic information source, associated interaction, and/or any suitable parameter. For example, events from a social network for select users are preferably accessible in the event history.

Figure 5A:
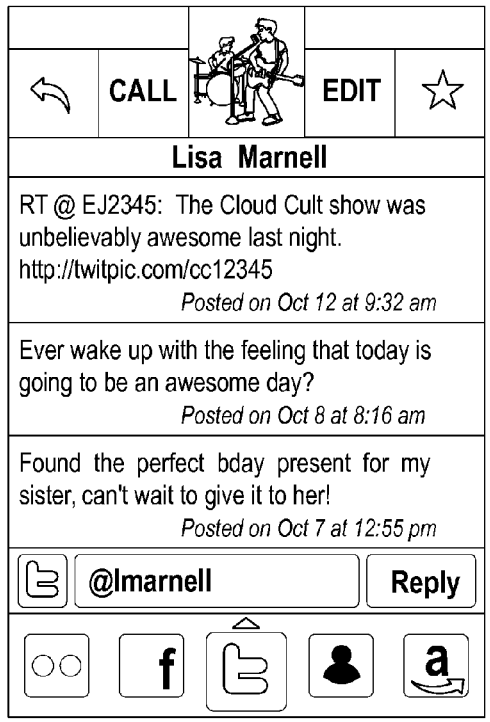
FIGS. 5A-5C are screenshots of variations of interaction services with varying dynamic information and facilitated interactions.
Figure 5B:
Figure 5C:
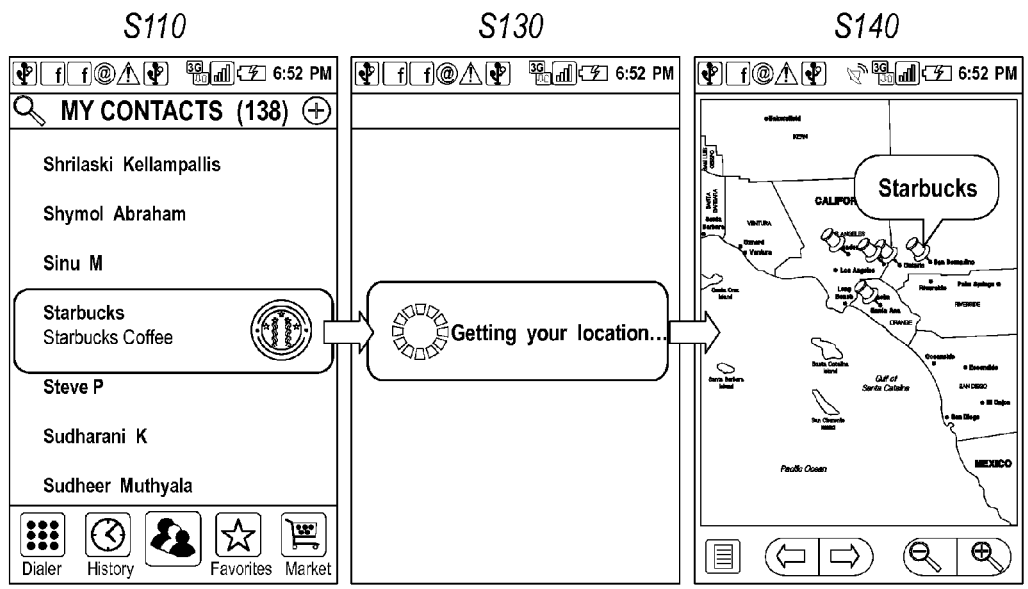

Step S140, which includes facilitating an interaction using the dynamic information, functions to submit a user response. The interaction may be in response to the dynamic information. For example, an interaction service of a social network would preferably allow a user to comment, reply, post media, rate, or perform any suitable action in response to a content stream retrieved in step S130 as shown in FIGS. 5A and 5B. Alternatively, the interaction may be enabled through analysis of the dynamic information. The dynamic information is preferably used to calculate or predict possible actions the user will want to take as shown in FIG. 5C. This functions to predict the context of viewing a contact. For example, a user may be able to book a reservation at a restaurant by selecting an available reservation slot through analysis of the current time and user location. In one embodiment, this response is made within the contact field of the address book (e.g., the detail view of a contact) but the interaction may take place within an isolated channel for an interaction service. For example, there may be a particular view within the electronic address book for viewing and interacting with all social networks. As part of the interaction, Step S140 preferably includes transmitting data to an external service from the device of the user. As such, the interaction preferably includes communicating over a network such as an internet network, a telephony network, a messaging network, or any suitable network. The interaction may alternatively include transmitting data to an application on the device of the user. For example, an event may be added to an electronic calendar on the device.

As an example of a social network interaction service, the method preferably includes facilitating an interaction of replying to a status message or media available on the social network.

As an example of an interaction service for a contact auto-categorized as a restaurant, the method preferably includes facilitating an interaction of displaying recent reviews and a user submitting a review; retrieving a menu for a restaurant and ordering a meal; arranging for an order to be delivered to the current location of the user (using GPS dynamic information); displaying a map of nearby restaurant locations and connecting a user to a selected restaurant; placing a reservation; and/or any suitable interaction.

As an example of an interaction service for a contact auto-categorized as an airline, the method preferably includes facilitating an interaction of providing flight information (using user flight information retrieved from email or a calendar) and allowing flight check-in; showing current flight prices for a planned trip and allowing tickets to be purchased; and/or any suitable flight related interaction.

In one embodiment of the preferred method, a mobile device preferably manages a plurality of contacts in an address book with social network integration or "mixins". A user is preferably able to add various social network interaction services to the address book. The address book preferably adds a social network or other external service by optionally adding an embedded application to the address book. The method then preferably retrieves the login information from the user. The login information of the user is preferably used to gain access to the social network. After approval of the credentials, the electronic address book or embedded application of the address book is provided a token by the social network, which can be used in the retrieval of information from the social network. Alternatively, any suitable authentication system such as OpenID may be used to retrieve social network related information such as a contact list, contact profile information, a content feed, or any suitable material from the social network. The contacts of the social network are preferably matched with the contacts of the address book. In some cases, new contacts are preferably added to the address book when a matching contact is not identified. After establishing a connection between the address book and the social network, dynamic information is preferably retrieved from the social network. A social network is preferably an additional view in the address book, or in other words, an isolated channel for viewing and interacting with the specific social network. The user can preferably interact with the social network through this view. Additionally or alternatively, contacts that are identified as having a relationship with this social network may provide social network interaction within the detail view of the related contacts. When an individual contact is selected, the social network stream of the contact is retrieved and displayed, and a reply to the contact can be posted through the interaction service. The information may additionally be added to an event history view from which the user may additionally interact. The event history may be filtered according to the interaction service (e.g., social network), the contact, group of contacts, type of event, or any suitable parameter.

In a second embodiment of the preferred method, a mobile device manages a plurality of contacts and the method is used to create "smart contacts" or in other words, contacts that have customized features based on the identity of the contact. The static information of the contacts is preferably analyzed, and at least one contact is identified as an entity with an assigned interaction service. For example, all the business contacts in the address book are identified as such. Specific interaction services are preferably activated for the contacts according to the type of categorization. Upon user selection of an identified contact, dynamic information is preferably retrieved, and then an embedded application preferably provides an interface for a user interaction related to the dynamic information. For example, if the address book has a listing for "Thai Restaurant" and the contact information has information matching that of a restaurant in database of restaurants serviced by a take out service then the "Thai Restaurant" contact will be identified as being associated with the take out service. Selecting the "Thai Restaurant" contact preferably causes a detail view of the contact to appear. The static information originally associated with "Thai Restaurant" is displayed, but additionally a take out ordering application may additionally be included which will order Thai food from various local Thai restaurants.

An alternative embodiment preferably implements the above methods in a computer-readable medium storing computer-readable instructions. The instructions are preferably executed by computer-executable components. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively, or additionally, be executed by any suitable dedicated hardware device. The computer-executable component is preferably designed for a mobile device such as a smart phone but may alternatively be designed for any suitable platform.

As a person skilled in the art will recognize from the previous detailed description and from the figures and claims, modifications and changes can be made to the preferred embodiments of the invention without departing from the scope of this invention defined in the following claims.

We claim:

1. A method for integrating interactions in an address book application comprising:
    managing a plurality of contacts of an electronic address book associated with a mobile communication device of a user, wherein each contact of the plurality of contacts includes static data including contact information for each contact;
    identifying a contact of the electronic address book with a relationship to an external interaction service, the external interaction service being a network based service;
    determining that the user has a login associated with the external interaction service;
    retrieving the login associated with the user for the external interaction service and submitting the login to the external interaction service;
    determining, by one or more processors, one or more members in the external interaction service that have a relationship with the user after submitting the login including accessing user related information stored in the external interaction service to identify other members in the external interaction service that have a relationship with the user;
    evaluating data for the determined one or more members including:
        comparing data associated with the determined one or more members with static data included in the electronic address book; and
        locating a match of a member of the determined one or more members from the external interaction service to a matched contact in the electronic address book based on the comparing, including locating the member from the external interaction service that shares a unique identifier with the matched contact in the electronic address book, wherein the unique identifier is not a name associated with the matched contact;
    associating the matched contact with the external interaction service including adding an identifier for the external interaction service and other data related to the matched contact's identity in the external interaction service to the static data for the matched contact;
    after associating the matched contact with the external interaction service, collecting dynamic information corresponding to one or more contacts associated with the external interaction service from the external interaction service and storing the dynamic information for each of the one or more associated contacts as an event associated with the each contact;
    receiving a selection of a specific contact while executing the address book on the mobile communication device; and
    upon receipt of the selection of the specific contact, facilitating an interaction with the specific contact using the external interaction service and using the dynamic information including:
        locating the event associated with the specific contact in storage and presenting the dynamic information collected for the specific contact;
        presenting a particular view within the electronic address book, the particular view for viewing the located event and for interacting with any associated external interaction service;
        receiving a communication for the specific contact through the particular view; and
        enabling the communication using an embedded application associated with the external interaction service associated with the specific contact and the located event.

2. The method of claim 1, wherein managing a plurality of contacts includes storing static data of a contact of the plurality of contacts.

3. The method of claim 2, wherein facilitating an interaction includes transmitting data associated with the interaction to the external interaction service.

4. The method of claim 3, wherein transmitting data includes communicating over a network.

5. The method of claim 3, further comprising installing the embedded application that facilitates the interaction with the external interaction service.

6. The method of claim 2, wherein identifying a contact of the electronic address book includes matching static data of the contact to an entity with an assigned identity.

7. The method of claim 6, wherein matching static data includes matching contact name data of a contact to a name of a business with pre-identified interaction services.

8. The method of claim 6, wherein the assigned identity includes a type of business, and wherein the type of business is associated with the external interaction service provided during the facilitated interaction.

9. The method of claim 2, wherein the dynamic information includes time, location, and calendar information.

10. The method of claim 1, wherein identifying a contact of the electronic address book includes matching members from the external interaction service to the plurality of contacts of the electronic address book using items other than contact name wherein the items are selected from the group comprising address, telephone number, email address, or user name in the service when the user name is not the name of the contact.

11. The method of claim 10, wherein the external interaction service is a social networking system.

12. The method of claim 11, wherein the dynamic information is a content stream of the social networking system and wherein the facilitated interaction is posting user content to the social networking system.

13. The method of claim 10, further comprising collecting dynamic information of the social networking system as a background routine and adding at least one item of information to an event history.

14. The method of claim 13, further comprising receiving user viewing settings and filtering the collection of dynamic information according to the viewing settings.

15. A non-transitory computer-readable medium storing computer-readable instructions for integrating interactions in an address book application, the instructions being executable on a processor to perform operations comprising:

managing a plurality of contacts of an electronic address book associated with a mobile communication device of a user, wherein each contact of the plurality of contacts includes static data including contact information for each contact;

identifying a contact of the electronic address book with a relationship to an external interaction service, the external interaction service being a network based service;

determining that the user has a login associated with the external interaction service;

retrieving the login associated with the user for the external interaction service and submitting the login to the external interaction service;

determining, by one or more processors, one or more members in the external interaction service that have a relationship with the user after submitting the login including accessing user related information stored in the external interaction service to identify other members in the external interaction service that have a relationship with the user;

evaluating data for the determined one or more members including:
  comparing data associated with the determined one or more members with static data included in the electronic address book; and
  locating a match of a member of the determined one or more members from the external interaction service to a matched contact in the electronic address book based on the comparing, including locating the member from the external interaction service that shares a unique identifier with the matched contact in the electronic address book, wherein the unique identifier is not a name associated with the matched contact;

associating the matched contact with the external interaction service including adding an identifier for the external interaction service and other data related to the matched contact's identity in the external interaction service to the static data for the matched contact;

after associating the matched contact with the external interaction service, collecting dynamic information corresponding to one or more contacts associated with the external interaction service from the external interaction service and storing the dynamic information for each of the one or more associated contacts as an event associated with the each contact;

receiving a selection of a specific contact while executing the address book on the mobile communication device; and upon receipt of the selection of the specific contact, facilitating an interaction with the specific contact using the external interaction service and using the dynamic information including:
  locating the event associated with the specific contact in storage and presenting the dynamic information collected for the specific contact;
  presenting a particular view within the electronic address book, the particular view for viewing the located event and for interacting with any associated external interaction service;
  receiving a communication for the specific contact through the particular view; and
  enabling the communication using an embedded application associated with the external interaction service associated with the specific contact and the located event.

16. The non-transitory computer-readable medium of claim 15, wherein managing a plurality of contacts includes storing static data of a contact of the plurality of contacts.

17. The non-transitory computer-readable medium of claim 15, wherein facilitating an interaction includes transmitting data associated with the interaction to the external interaction service.

18. The non-transitory computer-readable medium of claim 15, wherein identifying a contact of the electronic address book includes matching members from the external interaction service to the plurality of contacts of the electronic address book using items other than contact name wherein the items are selected from the group comprising address, telephone number, email address, or user name in the service when the user name is not the name of the contact.

19. The non-transitory computer-readable medium of claim 15, wherein the external interaction service is a social networking system.

20. The non-transitory computer-readable medium of claim 19, wherein the dynamic information is a content stream of the social networking system and wherein the facilitated interaction is posting user content to the social networking system.

* * * * *

UNITED STATES PATENT AND TRADEMARK OFFICE
CERTIFICATE OF CORRECTION

PATENT NO. : 9,519,613 B2  Page 1 of 1
APPLICATION NO. : 12/698874
DATED : December 13, 2016
INVENTOR(S) : Howard Chou et al.

It is certified that error appears in the above-identified patent and that said Letters Patent is hereby corrected as shown below:

In the Claims

Column 8, Line 23, in Claim 2: after "a" insert --particular--.

Signed and Sealed this
Twenty-eighth Day of February, 2017

Michelle K. Lee
*Director of the United States Patent and Trademark Office*